United States Patent [19]

Kubo et al.

[11] Patent Number: 5,445,508

[45] Date of Patent: Aug. 29, 1995

[54] VULCANIZING MOLD SETTING APPARATUS

[75] Inventors: Kenji Kubo; Katsumi Ichikawa; Kashiro Ureshino; Toshio Kurosaki, all of Takasago; Shigeru Kaneko, Kodaira, all of Japan

[73] Assignee: Kabushiki Kaisha Kobe Seiko Sho, Kobe, Japan

[21] Appl. No.: 369,331

[22] Filed: Jan. 6, 1995

Related U.S. Application Data

[63] Continuation of Ser. No. 99,649, Jul. 30, 1993, abandoned.

[30] Foreign Application Priority Data

Aug. 6, 1992 [JP] Japan .................................. 4-210392
Jul. 12, 1993 [JP] Japan .................................. 5-171869

[51] Int. Cl.$^6$ ............................................. H60N 33/30
[52] U.S. Cl. .................................. 425/28.1; 425/186; 425/193; 425/195
[58] Field of Search .................. 425/28.1, 47, 183, 186, 425/193, 195

[56] References Cited

U.S. PATENT DOCUMENTS

| | | | |
|---|---|---|---|
| 3,792,947 | 2/1974 | Diehl | 425/193 |
| 4,444,039 | 4/1984 | Asari et al. | 72/342 |
| 4,449,907 | 5/1984 | Yonezawa et al. | 425/183 |
| 4,459,909 | 7/1984 | Takagi | 100/295 |
| 4,472,127 | 9/1984 | Cyriax et al. | 425/183 |
| 4,601,648 | 7/1986 | Amano et al. | 425/47 |
| 5,015,165 | 5/1991 | Ozaki et al. | 425/28.1 |
| 5,118,269 | 6/1992 | Klose et al. | 425/47 |

FOREIGN PATENT DOCUMENTS

| | | |
|---|---|---|
| 3229529 | 2/1983 | Germany . |
| 59-70536 | 4/1984 | Japan . |
| 60-159010 | 8/1985 | Japan . |
| 1418250 | 12/1975 | United Kingdom . |

*Primary Examiner*—James P. Mackey
*Attorney, Agent, or Firm*—Oblon, Spivak, McClelland, Maier & Neustadt

[57] ABSTRACT

A vulcanizing mold setting apparatus for setting a vulcanizing mold assembly (21) on the platen (6) of a tire vulcanizing apparatus (1) comprises: a mold transfer mechanism (54) comprising a mold carriage (49) for horizontally moving the vulcanizing mold assembly (21) to and away from the tire vulcanizing machine (1), a pair of guide units (41) disposed respectively on the opposite sides of the platen (6), and a pair of mold supporting units (24) disposed respectively on the opposite sides of the platen (6) behind the guide units (41) to support the vulcanizing mold assembly (21) above the platen (6); a pair of lifting mechanisms (27) for vertically moving the mold supporting units (24) to place the vulcanizing mold on the platen (6); a centering mechanism (29) for centering the vulcanizing mold assembly (21) on the platen (6); and clamping members (26) for fastening the fixed mold (7) of the vulcanizing mold assembly (21) to the platen (6) after the vulcanizing mold assembly (21) has been centered on the platen (6).

10 Claims, 11 Drawing Sheets

VULCANIZING MOLD SETTING APPARATUS

This application is a continuation of application Ser. No. 08/099,649, filed on Jul. 30, 1993, now abandoned.

BACKGROUND OF THE INVENTION

1. Field of the Invention

The present invention relates to a vulcanizing mold setting apparatus for setting a vulcanizing mold on a vulcanizing machine and, more particularly, to a tire vulcanizing mold setting apparatus capable of automatically setting a tire vulcanizing mold on a vulcanizing machine.

2. Description of the Prior Art

A tire vulcanizing machine pertinent to the present invention will be described with reference to FIG. 11. As shown in FIG. 11, a hydraulic, vertical tire vulcanizing machine 1 has a frame comprising a base frame member 2, side frame members 3 and a top frame member 4. A heat insulating plate 5 and a lower heating plate 6, i.e., a heating platen, are mounted in that order on the base frame member 2 and fastened to the base frame member 2 with bolts or the like, and a fixed mold 7 is mounted on the lower heating plate 6. A heat insulating member 10, an upper heating plate 9 and a movable mold 8 mating with the fixed mold 7 are attached in that order to a slider 11. The slider 11 holding the heat insulating member 10, the upper heating plate 9 and the movable mold 8 is moved vertically along the side frame members 3 by a lifting cylinder actuator 12 held on the top frame member 4. A pressure rod 13 extends vertically upward from the slider 11, and a cylinder 14 is fixed to the top frame member 4. The cylinder 14 applies pressure through a split nut 15 to the pressure rod 13.

The vulcanizing mold needs to be removed from the tire vulcanizing machine 1 to mount another vulcanizing mold for vulcanizing tires of another type on the tire vulcanizing machine 1 or to repair the vulcanizing mold. A vulcanizing mold mounted on the tire vulcanizing machine 1 is replaced with the vulcanizing mold shown in FIG. 11 by three steps. In a first step, the slider 11 is raised to its uppermost position and the vulcanizing mold on the tire vulcanizing machine 1 is removed, and then the vulcanizing mold assembly, i.e., the combination of the fixed mold 7 and the movable mold 8, is mounted and set temporarily on the lower heating plate 6 by a forklift truck or a hoist. In a second step, the fixed mold 7 is positioned and fixed to the lower heating plate 6. Generally, the work in the second step is carried out manually by a skilled operator by using a forklift truck or a hoist. In a third step, the slider 11 is lowered so that the upper heating plate 9 is seated on the movable mold 8, and then the movable mold 8 is fixed to the upper heating plate 9 with bolts or the like. The second step for positioning and fixing the fixed mold 7 is the most important step among those three steps.

A mold centering and clamping apparatus intended to simplify the work in the step 2 and to ensure the accurate positioning of the fixed mold 7 relative to the lower heating plate 6 is proposed in, for example, Japanese Patent Laid-open (Kokai) No. 2-130110. This known mold centering and clamping device has three mold centering members to be positioned around the fixed mold 7 at equal angular intervals, a plurality of clamping members and a single driving mechanism for simultaneously driving the plurality of clamping members. Although this known mold centering and clamping device is capable of automatically carrying out the second and third steps, the first step must be carried out manually by means of a forklift truck or a hoist, which requires much time and work to be carried out by the operator. Recently, the tire industry is required to produce tires of a variety of types in small lots, which entails frequent change of vulcanizing molds. Accordingly, if much time is spent for changing the vulcanizing mold, the rate of operation of the tire vulcanizing machine will be reduced labor cost will increase.

SUMMARY OF THE INVENTION

Accordingly, it is an object of the present invention to provide a vulcanizing mold setting apparatus capable of automatically carrying out a series of steps of vulcanizing mold setting operation including mounting a vulcanizing mold on a tire vulcanizing machine, centering the vulcanizing mold in alignment with the tire vulcanizing machine, and fixing the fixed mold of the vulcanizing mold to the platen of the tire vulcanizing machine.

In one aspect of the present invention, a vulcanizing mold setting apparatus comprises: a mold transfer means capable of supporting a vulcanizing mold in a horizontal position, of transferring the same to and receiving the same from a tire vulcanizing machine; a centering means for positioning the vulcanizing mold assembly on the platen of the tire vulcanizing machine; a lifting means capable of vertically moving the vulcanizing mold assembly; and a mold clamping means for detachably clamping the fixed mold of the vulcanizing mold assembly to the platen of the tire vulcanizing machine.

The mold transfer means comprises a mold carriage having a mold mount for supporting the vulcanizing mold assembly in a horizontal position and capable of moving toward and away from the tire vulcanizing machine, a pair of guide units disposed respectively on the opposite sides of the platen of the tire vulcanizing machine, and a pair of mold supporting units disposed respectively on the opposite sides of the platen of the tire vulcanizing machine and having supporting members having supporting surfaces.

The centering means comprises guide members arranged on the supporting surfaces of the supporting members of the mold transfer means to position the vulcanizing mold assembly with respect to a lateral direction, and stoppers disposed behind the pair of supporting members to limit the advancement of the vulcanizing mold assembly.

The vulcanizing mold assembly is supported on a horizontally movable mold supporting plate having lugs projecting from the opposite sides thereof, having parallel edges and capable of horizontally moving along the mold mount and the supporting surfaces of the supporting portions of the pairs of supporting units of the mold transfer means.

Either the mold mount of the mold carriage of the mold transfer means or the supporting portions of the pairs of supporting units, or both the mold mount and the supporting portions of the pairs of supporting units are provided with rolling members, such as balls or rollers, arranged at intervals along the direction of advancement of the mold supporting plate.

The mold transfer means is provided with a lifting means for vertically moving the mold supporting plate supporting the vulcanizing mold assembly in a horizontal position.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Preferred embodiments of the present invention will be described hereinafter with reference to the accompanying drawings, in which "longitudinal" refers to directions in which a vulcanizing mold assembly 21 is moved when mounting the same on and removing the same from the tire vulcanizing machine 1 and "lateral" refers to directions perpendicular to the longitudinal directions.

Figure 11:
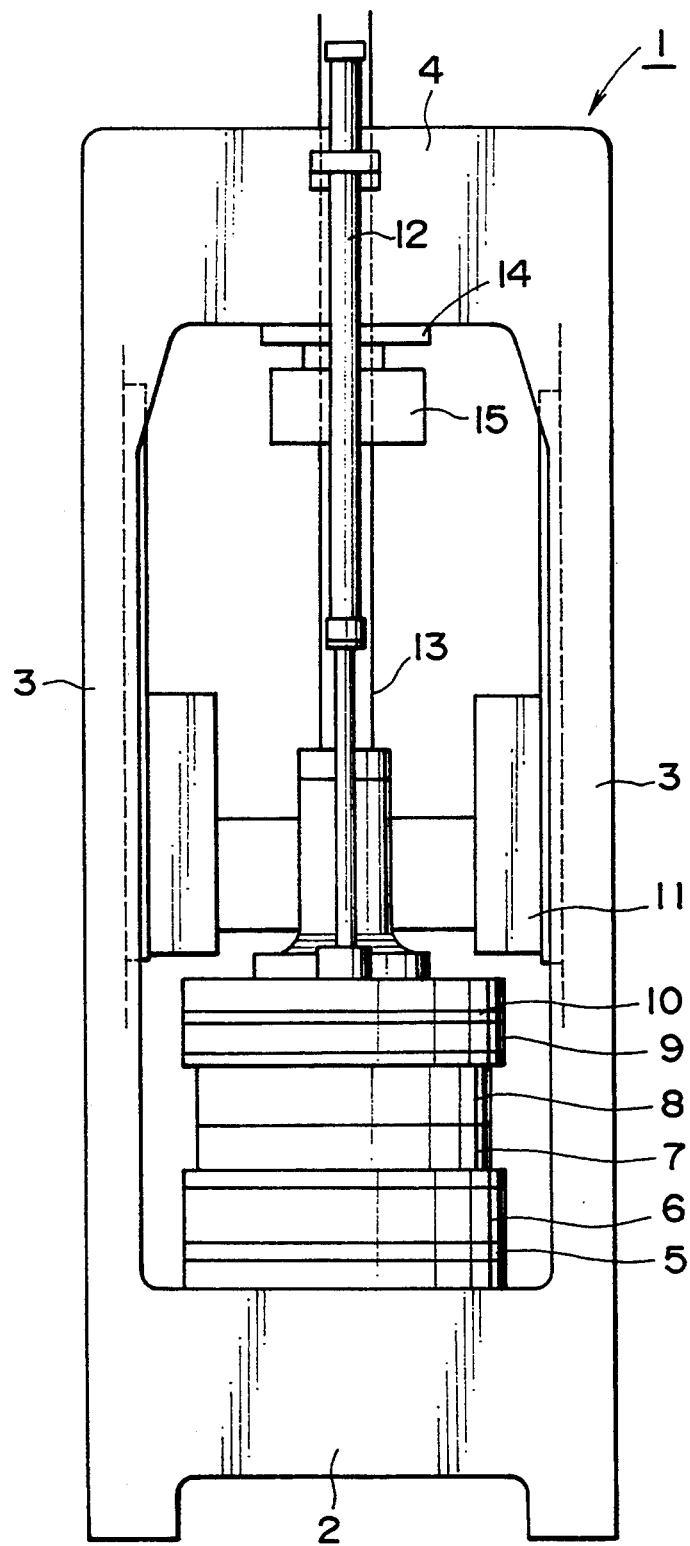
FIG. 11 is a front view of a tire vulcanizing machine to which the present invention is applied.

Referring to FIGS. 1 to 5, a vulcanizing mold setting apparatus 20 in a first embodiment according to the present invention comprises, as principal components, a mold transfer mechanism 54 capable of supporting a mold supporting plate 23 fixedly supporting a vulcanizing mold assembly 21 consisting of a fixed mold 7 and a movable mold 8 in a horizontal position and of horizontally moving the mold supporting plate 23, a centering mechanism 29 for positioning the vulcanizing mold assembly 21 on the lower heating plate 6, i.e., the platen, of the tire vulcanizing machine 1 (FIG. 11), lifting mechanisms 27 for vertically moving the mold supporting plate 23 fixedly supporting the vulcanizing mold assembly 21 above the lower heating plate 6 relative to the lower heating Plate 6, and clamping mechanisms each having clamping members 26 for detachably holding the mold supporting plate 23 fixedly supporting the vulcanizing mold assembly 21 on the lower heating plate 6.

The mold transfer mechanism 54 comprises a mold carriage 49 having a mold mount 49A for supporting the vulcanizing mold assembly 21 in a horizontal position, and a pair of mold supporting units 24 having supporting members 24A having supporting surfaces. The mold carriage 49 is provided with a lifting mechanism 50 for vertically moving the mold mount 49A to adjust the height of the mold mount 49A so that the supporting surface of the mold mount 49A is flush with the supporting surfaces of the supporting members 24A of the mold supporting units 24.

Figure 4:
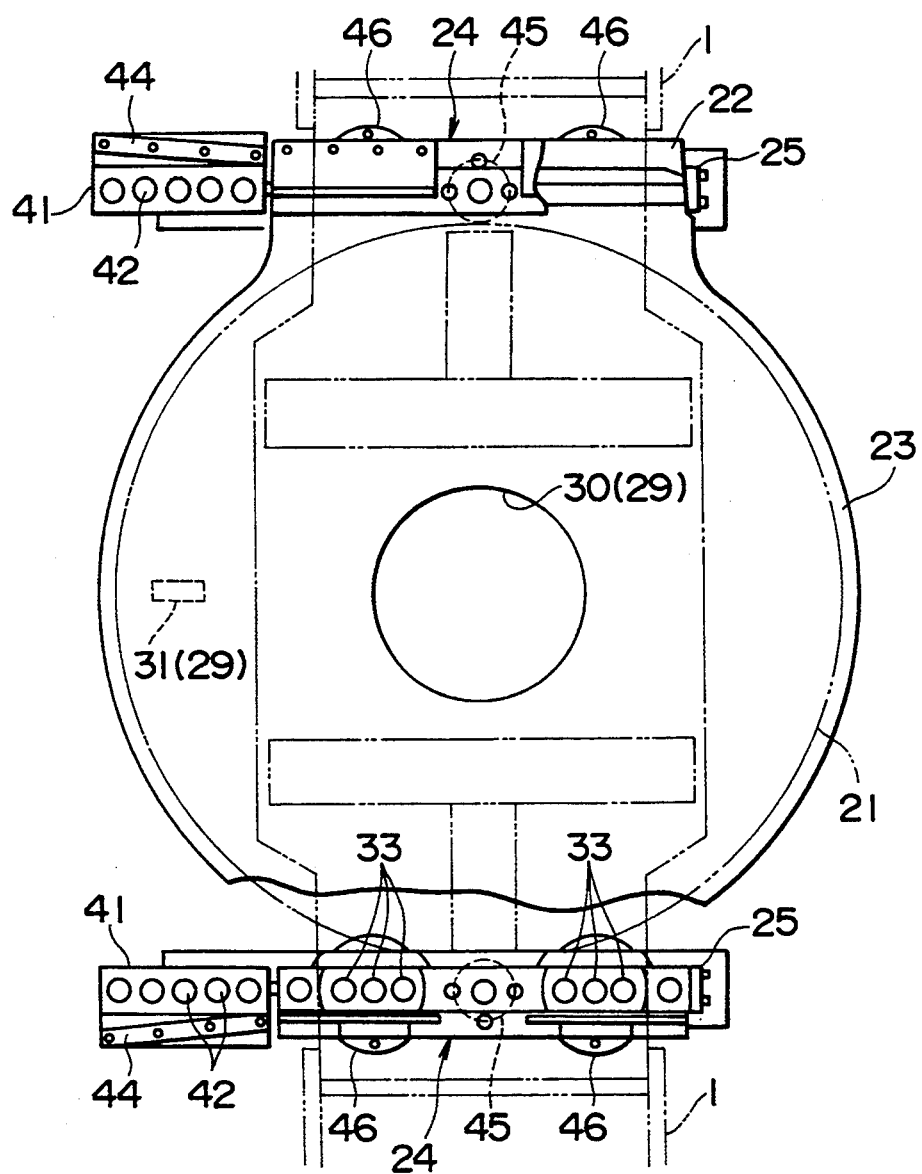
FIG. 4 is a plan view of an essential portion of the vulcanizing mold setting apparatus of FIG. 1.

The vulcanizing mold assembly 21 is fixedly supported in a horizontal position on the mold supporting plate 23 mounted on the mold mount 49A of the mold carriage 49. As best shown in FIG. 4, the mold supporting plate 23 is a substantially circular plate having lugs 22 laterally projecting from the opposite sides thereof and respectively having parallel edges, and provided with a tapered centering hole 30 in the central portion thereof and a keyway 31 formed in the lower surface of the front portion thereof.

The mold supporting units 24 have a pair of frames 32 fixed to the base frame 2 of the tire vulcanizing machine 1 at positions on the opposite sides of the lower heating plate 6, and a pair of rails 34 supported by lifting mechanisms 27 on the frames 32 and provided with balls 33 arranged at intervals. The lugs 22 of the mold supporting plate 23 move along the sliding plates 34 in rolling contact with the balls 33 so that the mold supporting plate 23 can be smoothly moved in all directions for positioning. Each ball 33 is put in a hole 35 and seated for rotation on a bearing plate 36 placed on the bottom of the hole 35. The clamping members 26 each having a positioning projection 37 and a holding portion 26A are fastened to the rails 34 with bolts 38. In a state where the lugs 22 are supported on the rails 34, a gap 40 is formed between the upper surfaces of the lugs 22 and the lower surfaces of the corresponding holding portions 26A.

Guide units 41 for guiding the vulcanizing mold assembly 21 are fixed to the frames 32 at positions near the front ends of the mold supporting units 24, respectively. Each guide unit 41 has a rail 43, balls 42 put in holes formed in the upper surface of the rail 43 for rolling therein, and a guide plate 44 fixed to the upper surface of the rail 43. The guide plates 44 are extended so as to converge toward the tire vulcanizing machine 1. The lugs 22 of the mold supporting plate 23 are guided by the guide plates 44 so that the mold supporting-plate 23 is centered as the mold supporting plate 23 is inserted in the mold supporting units 24. Stoppers 25 are attached to the back ends of the mold supporting units 24, respectively, to limit the advancement of the vulcanizing mold assembly 21. The guide plates 44 and the stoppers 25 are the components of the centering mechanism 29.

Figure 1:
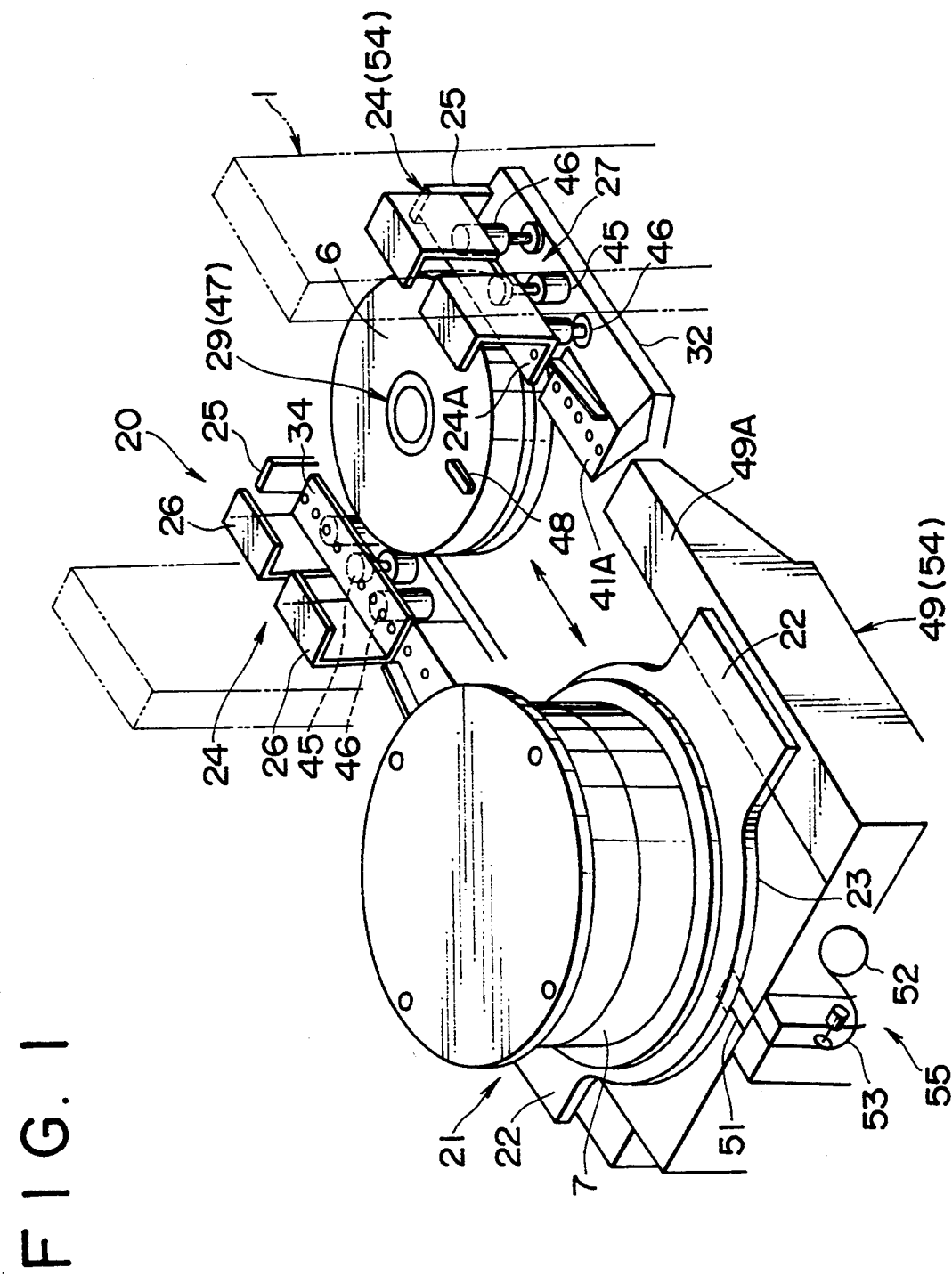
FIG. 1 is a perspective view of a vulcanizing mold setting apparatus in a first embodiment according to the present invention.
Figure 2:
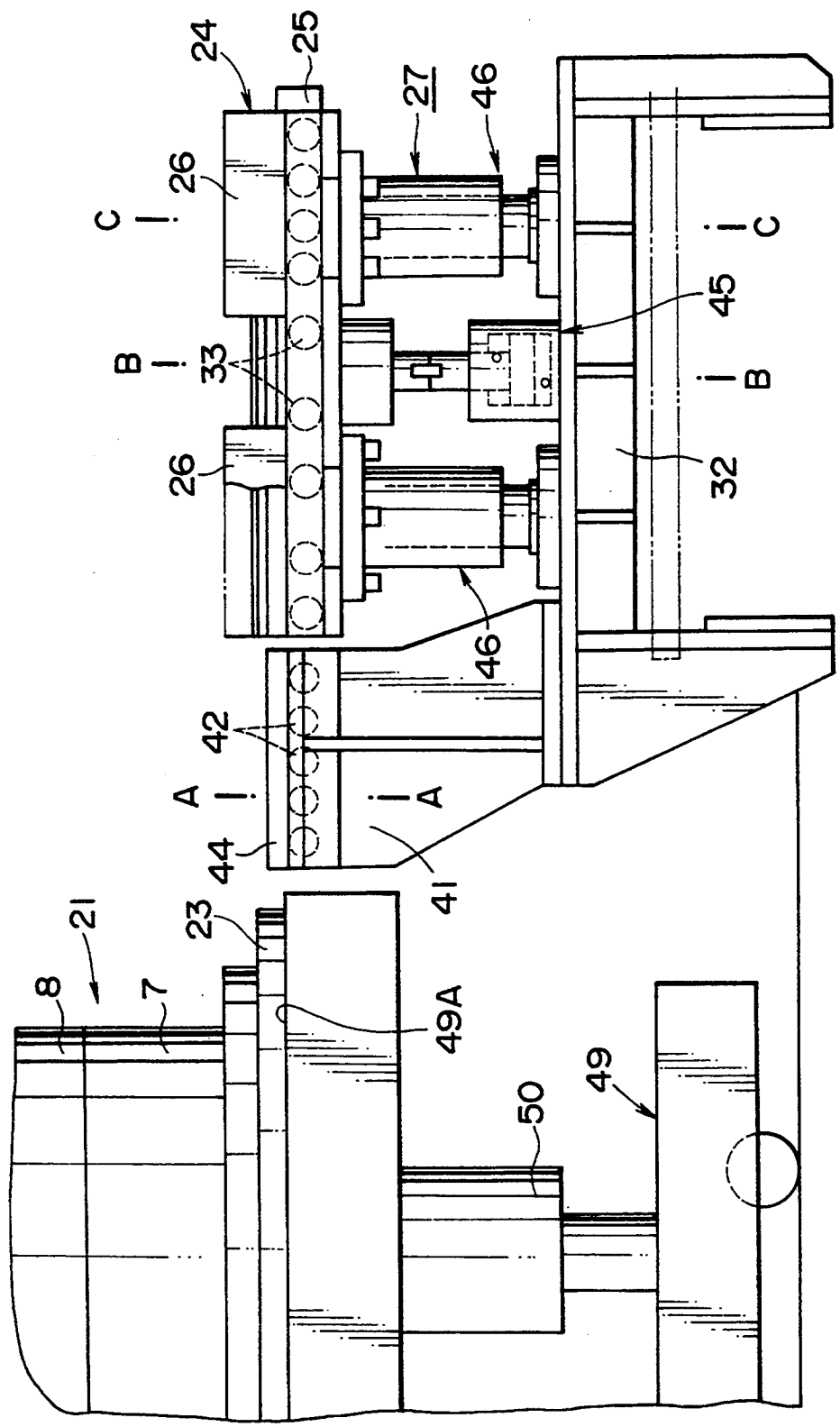
FIG. 2 is a side view of the vulcanizing mold setting apparatus of FIG. 1.
Figure 3C:
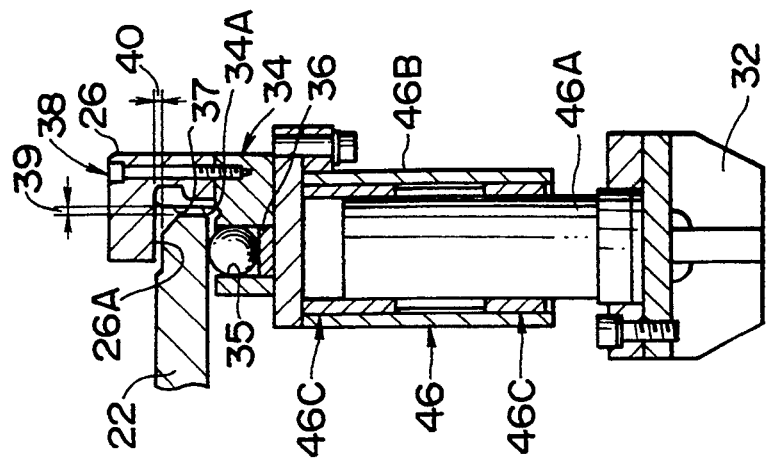
FIGS. 3(A), 3(B) and 3(C) are sectional views taken on line A—A, on line B—B and on line C—C, respectively, in FIG. 2.
Figure 3B:
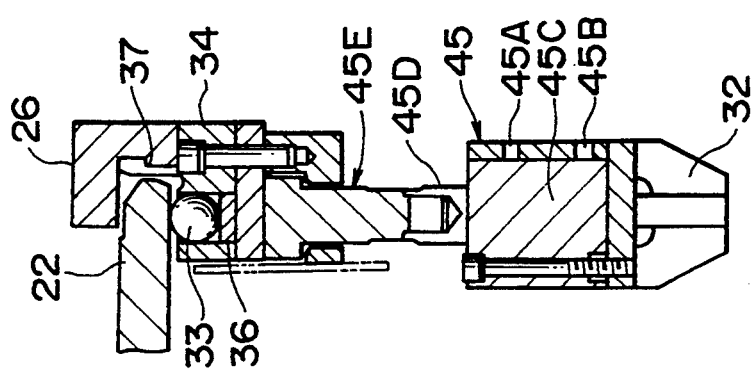
Figure 3A:
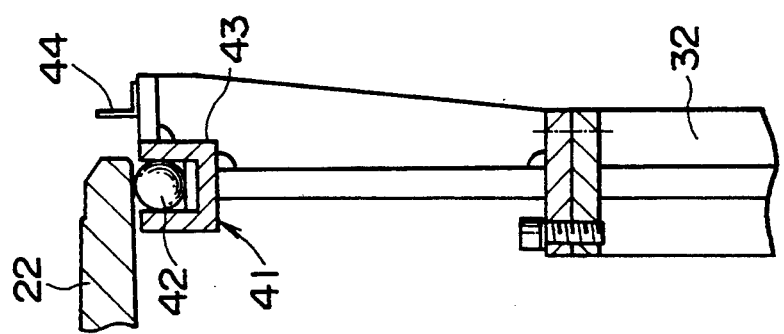

As shown in FIGS. 2, 3(B) and 3(C), each lifting mechanism 27 comprises a lifting device 45 disposed between the mold supporting unit 24 and the frame 32, and two vertical guides 46. The vertical guides 46 of each set disposed on the opposite sides, respectively, of the lifting device 45. The lifting device 45 comprises a hydraulic cylinder actuator 45C having a cylinder provided with two ports 45A and 45B and fixed to the frame 32, and a piston slidably fitted in the cylinder, a piston rod 45D projecting upward from the piston, and a connecting rod 45E having one end joined to the piston rod 45D and the other end joined to the mold supporting unit 24. Each vertical guide 46 comprises a rod 46A fixed to the frame 32 in an upright position, a cylinder 46B having upper end joined to the mold supporting unit 24, and a slide bushes 46C interposed between the rod 46A and the cylinder 46B. The hydraulic cylinder actuator 46C of the lifting device 45 is driven to move the mold supporting unit 24 vertically together with the clamping members 26. The mold supporting unit 24 is guided by the vertical guides 46 for vertical movement. When the mold supporting units 24 are lowered, the lugs 22 of the mold supporting plate 23 fixedly supporting the vulcanizing mold assembly 21 are held on the lower heating plate 6.

Figure 5:
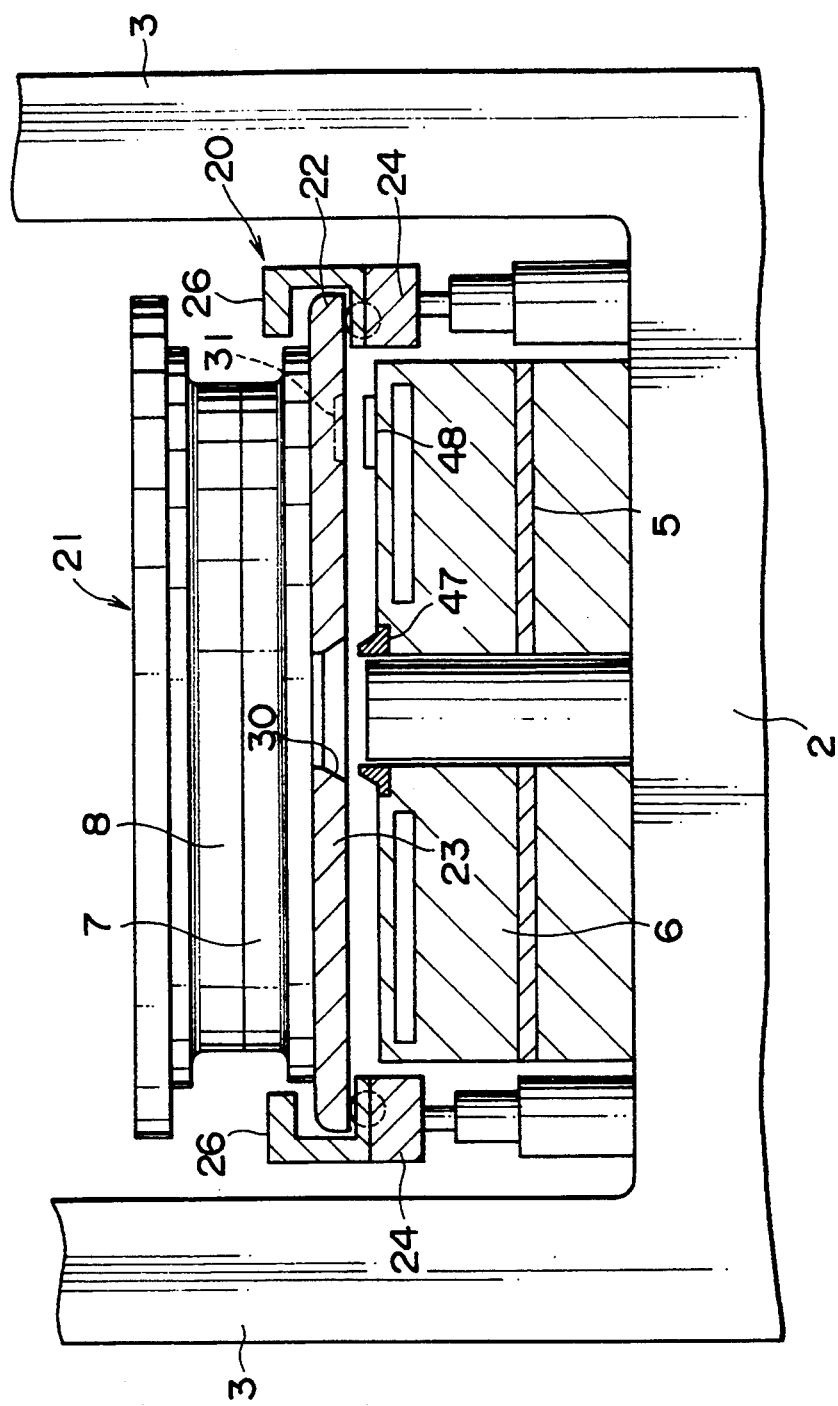
FIG. 5 is a longitudinal sectional view of the vulcanizing mold setting apparatus in mold setting operation.

As shown in FIG. 5, the centering mechanism 29 comprises the guide plates 44, the stoppers 25, a tapered centering ring 47 fitting the tapered centering hole 30 of the mold supporting plate 23 and disposed on the upper surface of the lower heating plate 6, a key 48 fitting the keyway 31 formed in the lower surface of the mold supporting plate 23 and fixed to the upper surface of the lower heating plate 6. When the mold supporting units 24 supporting the mold supporting plate 23 fixedly supporting the vulcanizing mold assembly 21 are lowered by the hydraulic cylinder actuators 45C of the lifting devices 45, the tapered centering ring 47 is fitted in the tapered centering hole 30 for automatic centering and the key 48 is fitted in the keyway 31 to restrain the mold supporting plate 23 from turning.

The mold carriage 49 loaded with the mold supporting plate 23 fixedly supporting the vulcanizing mold assembly 21 can be positioned in front of the tire vulcanizing machine 1. The mold carriage 49 is provided with the lifting mechanism 50 (FIG. 2). The free end of a snaking chain 53 is connected to the front end of the mold supporting plate 23 by a connecting member 51, and a driving device 52 drives the snaking chain 53 to advance or retract the mold supporting plate 23 fixedly supporting the vulcanizing mold assembly 21. The driving device 52 and the snaking chain 53 constitute a mold moving mechanism 55.

The operation of the vulcanizing mold setting apparatus thus constructed will be described hereinafter with reference to FIGS. 1 to 5. The mold carriage 49 mounted with the mold supporting plate 23 fixedly supporting the vulcanizing mold assembly 21 travels automatically to a transfer position in front of the tire vulcanizing machine 1. Then, the lifting mechanism 50 is operated to adjust the level of the mold supporting plate 23 to the level of the guide units 41 and the mold supporting units 24 so that the mold supporting plate 23 is able to be advanced into the guide units 41 and the mold supporting units 24. Then, the connecting member 51 is connected to the mold supporting plate 23, the snaking chain 53 is driven by the driving device 52 to advance the mold supporting plate 23 fixedly supporting the vulcanizing mold assembly 21 toward the lower heating plate 6. As the mold supporting plate 23 is advanced, the guide plates 44 engage the lugs 22 of the mold supporting plate 23 to center the mold supporting plate 23 approximately with respect to the lateral direction. The mold supporting plate 23 is advanced until the same is stopped by the stoppers 25. Consequently, the mold supporting plate 23 fixedly supporting the vulcanizing mold assembly 21 is centered approximately.

Then, the mold supporting units 24 are lowered together with the clamping members 26 by the lifting devices 45 of the lifting mechanisms 27, so that the clamping members 26 depress the lugs 22 to hold the mold supporting plate 23 firmly on the lower heating plate 6. When the lugs 22 are depressed, the mold supporting plate 23 is centered automatically by the centering mechanism 29.

Then, the slider 11 (FIG. 11) holding the upper heating plate 9 is lowered to seat the upper heating plate 9 on the movable mold 8, and then the upper heating plate 9 and the movable mold 8 are joined together by an automatic clamping device.

Thus, operations for mounting the vulcanizing mold assembly 21 on the lower heating plate 6 of the tire vulcanizing machine 1, positioning the mold supporting plate fixedly supporting the vulcanizing mold assembly 21 on the tire vulcanizing machine 21 and fastening the mold supporting plate 23 to the lower heating plate 6 are carried out successively and automatically. The steps of mounting the vulcanizing mold assembly 21 on the tire vulcanizing machine 1 are reversed to remove the vulcanizing mold assembly 21 from the tire vulcanizing machine 1.

In modifications of the foregoing vulcanizing mold setting apparatus, the following means may be employed.

The mold supporting plate 23 fixedly supporting the vulcanizing mold assembly 21 may be manually moved or may be moved by a hydraulic cylinder actuator when mounting the vulcanizing mold assembly 21 on and removing the same from the tire vulcanizing machine 1.

The rails 34 may be provided with slide shoes instead of the balls 33.

The positions of the stoppers 25 with respect to the direction of movement of the mold supporting plate 23 may be adjustable.

The lifting devices 45 of the lifting mechanisms 27 may employ screw jacks instead of the hydraulic cylinder actuators 45C.

The lifting mechanisms 27 may be capable of operating the mold supporting units 24 and the clamping members 26 separately.

Figure 6:
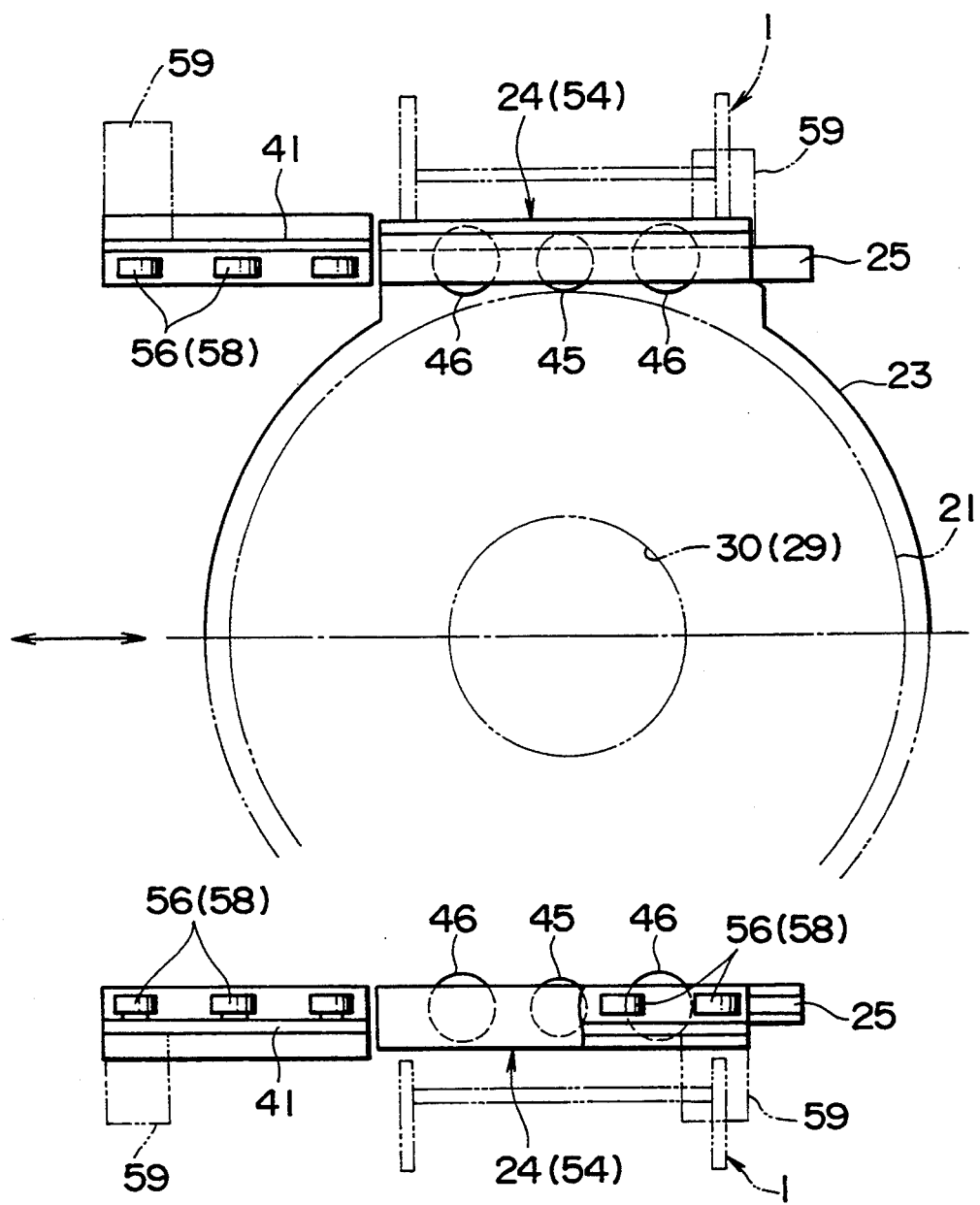
FIG. 6 is a fragmentary plan view of a vulcanizing mold setting apparatus in a second embodiment according to the present invention.
Figure 7:
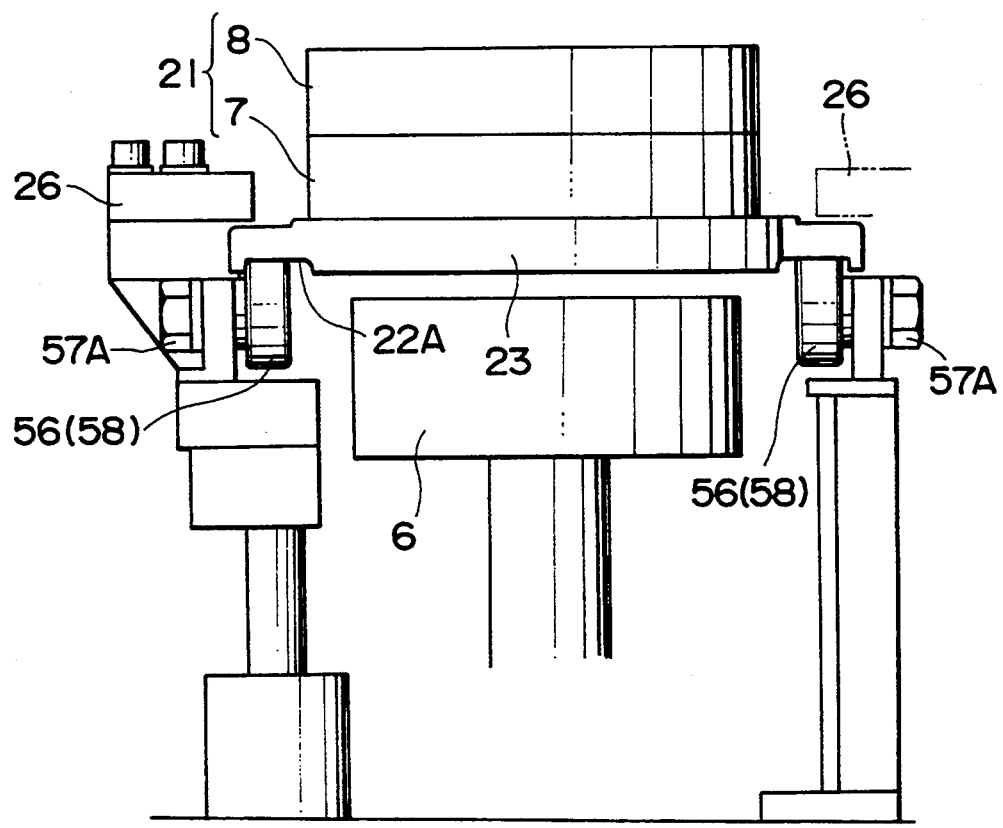
FIG. 7 is a front view of an essential portion of the vulcanizing mold setting apparatus of FIG. 6.
Figure 8:
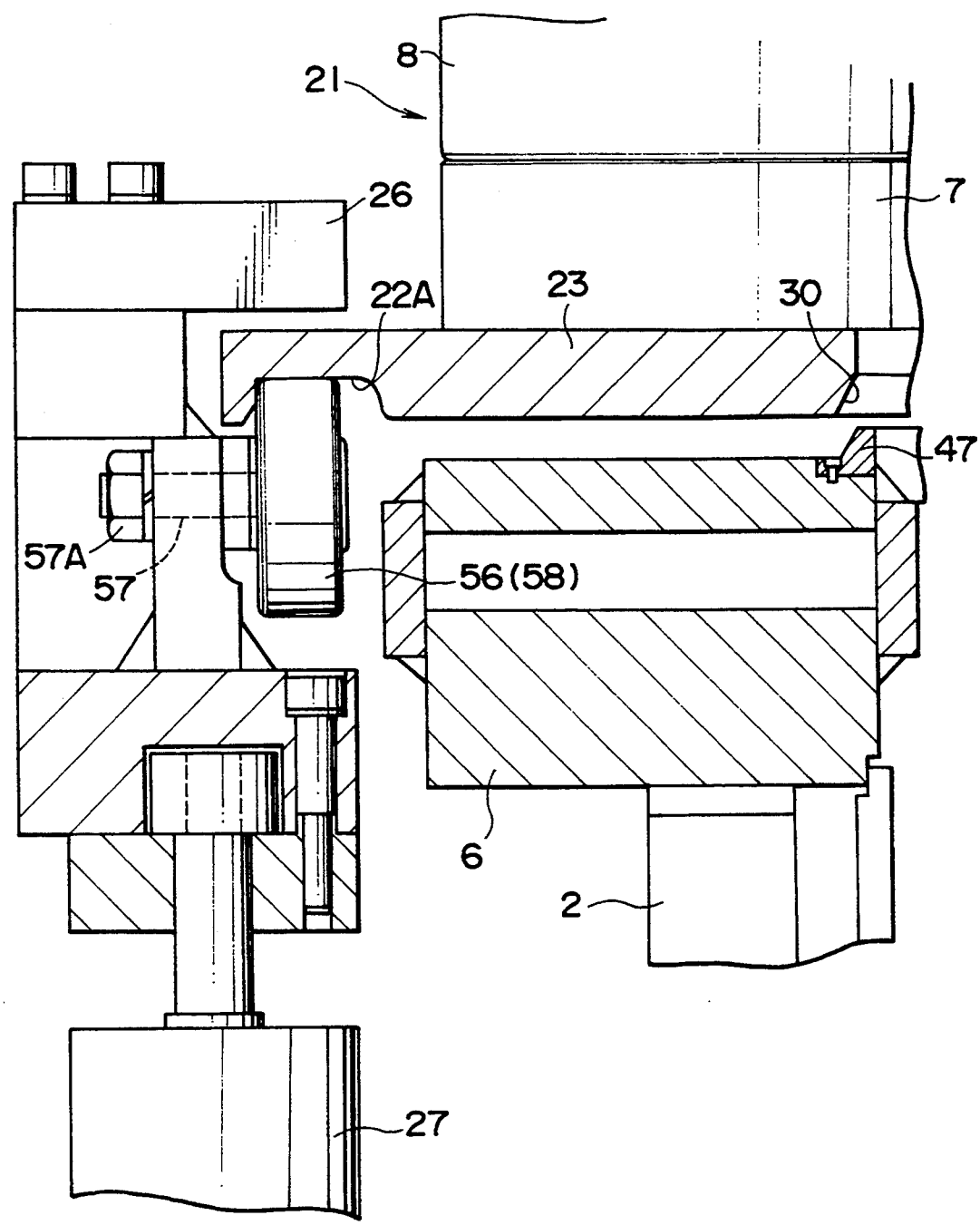
FIG. 8 is an enlarged view of a portion of FIG. 7.

FIGS. 6 to 8 show a vulcanizing mold setting apparatus in a second embodiment according to the present invention, which is substantially the same in construction as the vulcanizing mold setting apparatus in the first embodiment, except that the vulcanizing mold setting apparatus in the second embodiment is provided with rollers 56 instead of the balls 33 of the vulcanizing mold setting apparatus in the first embodiment. Therefore, parts like or corresponding to those previously described with reference to FIGS. 1 to 5 are denoted by the same reference characters and the description thereof will be omitted.

Referring to FIGS. 6 to 8, the lugs 22 of a mold supporting plate 23 are provided in their lower surfaces with longitudinal grooves 22A. A pair of mold supporting units 24 and a pair of guide units 41 are provided with the rollers 56. When the mold supporting plate 23 is guided by the guide units 41 and supported by the mold supporting units 24, the rollers 56 roll in the grooves 22A. The rollers 56 are supported by shafts 57A having lateral axes on substantially longitudinally extending brackets 57. The distance between the inner surfaces of the brackets 57 decreases toward the back ends of the mold supporting units 24 so that gaps are formed between the side surfaces of the grooves 22A and the corresponding side surfaces of the rollers 56 near the front ends of the guide units 41, the gaps decreases toward the back ends of the mold supporting units 24, and the outer side surfaces of the rollers 56 near the back end of the mold supporting units 24 are contiguous with the outer side surfaces of the corresponding grooves 22A, respectively. Thus, the mold supporting plate 23 is centered approximately when the same is stopped by stoppers 25. The the tapered centering ring 47 fits in the tapered centering hole when the mold supporting plate 23 is lowered by the lifting mechanisms 27 to center the supporting plate 23 perfectly.

Figure 9:
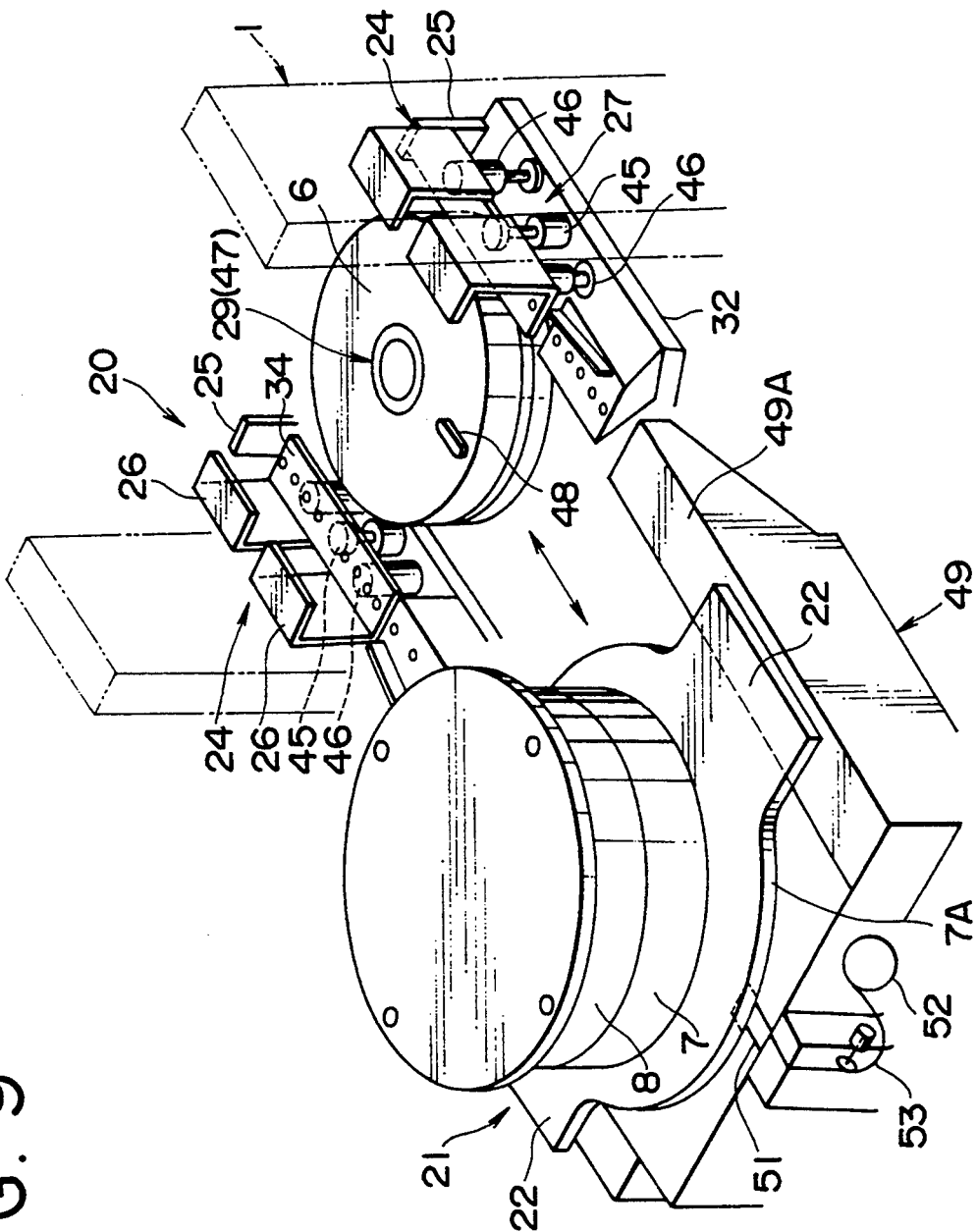
FIG. 9 is a perspective view of a vulcanizing mold setting apparatus in a third embodiment according to the present invention.

FIG. 9 shows a vulcanizing mold setting apparatus in a third embodiment according to the present invention. This vulcanizing mold setting apparatus is substantially the same in construction as the vulcanizing mold setting apparatus in the first embodiment, except that this vulcanizing mold setting apparatus is not provided with any member corresponding to the mold supporting plate 23 and uses a fixed mold 7 provided with a flange provided with lateral lugs corresponding to the lugs 22 of the mold supporting plates 23 employed in the first and second embodiments.

Figure 10:
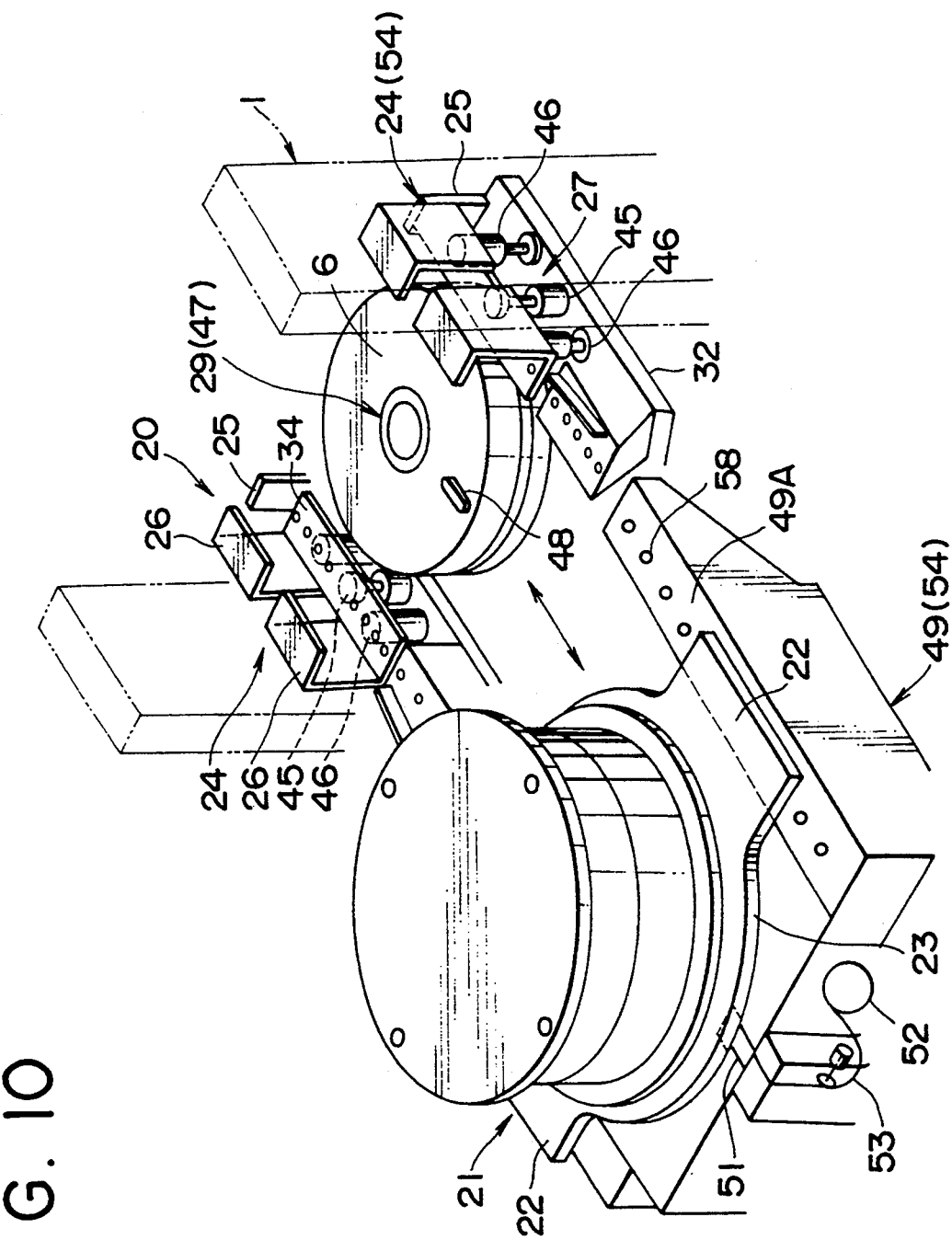
FIG. 10 is a perspective view of a vulcanizing mold setting apparatus in a fourth embodiment according to the present invention.

FIG. 10 shows a vulcanizing mold setting apparatus in a fourth embodiment according to the present invention. This vulcanizing mold setting apparatus is substantially the same in construction as the vulcanizing mold setting apparatus in the first embodiment, except that this vulcanizing mold setting apparatus employs a mold carriage 49 having a mold mount 49A provided in its upper surface with rolling members 58, such as the balls 33 employed in the first embodiment or rollers 56 employed in the second embodiment.

The rollers 56 may be combined respectively with sprockets driven through a chain by a reversible motor or pulleys driven through a belt by a reversible motor for positively rotating the rollers 56 to move the vulcanizing mold assembly 21 onto and away from the tire vulcanizing machine 1.

The mold carriages 49 employed in the foregoing embodiments may be unmanned automotive mold carriages.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A vulcanizing mold setting apparatus for setting a vulcanizing mold assembly including a fixed mold and a movable mold on a platen of a tire vulcanizing machine, said vulcanizing mold setting apparatus comprising:
    a mold transfer mechanism for supporting the vulcanizing mold assembly in a horizontal position and for horizontally moving the vulcanizing mold assembly toward and away from the tire vulcanizing machine;
    a centering mechanism which centers the vulcanizing mold assembly on the platen as a result of the vulcanizing mold assembly being lowered onto the platen;
    lifting mechanisms for vertically moving the vulcanizing mold assembly above the platen and lowering the vulcanizing mold assembly onto the platen; and
    clamping members for fastening the fixed mold of the vulcanizing mold assembly onto the platen when the vulcanizing mold assembly is lowered onto the platen by the lifting mechanisms and centered on the platen by the centering mechanism.

2. A vulcanizing mold setting apparatus according to claim 1, wherein the mold transfer mechanism comprises:
    a mold carriage positionable at a transfer position at one side of the tire vulcanizing machine and provided with a mold mount for supporting the vulcanizing mold assembly in a horizontal position; guide units disposed respectively on opposite sides of the platen and having supporting members for supporting the vulcanizing mold assembly, and mold supporting units disposed respectively on the opposite sides of the platen and in alignment With the guide units.

3. A vulcanizing mold setting apparatus according to claim 2, wherein the centering mechanism further comprises:
    a pair of guide plates fixed respectively to upper surfaces of the supporting members of the guide units at one end of the mold transfer mechanism; stoppers disposed respectively at ends of the mold supporting units opposite said one end so as to limit the advancement of the vulcanizing mold assembly into the tire vulcanizing machine.

4. A vulcanizing mold setting apparatus according to claim 2, wherein the vulcanizing mold assembly is supported on a mold supporting plate for transferring the vulcanizing mold assembly between the tire vulcanizing machine and the mold carriage, the mold supporting plate has laterally projecting lugs which are supported sequentially on the supporting surfaces of the mold mount of the mold carriage, the supporting surfaces of the guide units and the supporting surfaces of the mold supporting units, wherein the mold supporting plate supporting the vulcanizing mold assembly is advanced from the mold carriage into the tire vulcanizing machine.

5. A vulcanizing mold setting apparatus according to claim 2, wherein supporting surfaces of the mold mount of the mold carriage are provided with rolling members.

6. A vulcanizing mold setting apparatus according to claim 2, wherein supporting surfaces of the mold supporting units and the guide units are provided with rolling members.

7. A vulcanizing mold setting apparatus according to claim 2, wherein the supporting surfaces of the mold mount of the mold carriage, mold supporting members of the mold supporting units and the supporting members of the guide units are provided with rolling members.

8. A vulcanizing mold setting apparatus according to any one of claims 5 to 7, wherein the rolling members are balls.

9. A vulcanizing mold setting apparatus according to any one of claims 5 to 7, wherein the rolling members are rollers.

10. A vulcanizing mold setting apparatus according to claim 1, wherein the mold transfer mechanism is provided with a driving mechanism for horizontally moving the vulcanizing mold assembly supported in said horizontal position.

* * * * *